US005383372A

United States Patent [19]

Qureshi et al.

[11] Patent Number: 5,383,372

[45] Date of Patent: Jan. 24, 1995

[54] PIPETTE

[75] Inventors: Humayun Qureshi, Wayland; Donald Schwartz, Marblehead, both of Mass.

[73] Assignee: DRD Diluter Corp., Danvers, Mass.

[21] Appl. No.: 81,487

[22] Filed: Jun. 22, 1993

Related U.S. Application Data

[63] Continuation of Ser. No. 956,906, Oct. 2, 1992, abandoned, which is a continuation of Ser. No. 571,081, Aug. 22, 1990, abandoned.

[51] Int. Cl.[6] ............ G01N 1/14; B01L 3/02

[52] U.S. Cl. ............ 73/864.17; 436/180

[58] Field of Search ............ 73/864.17, 863.32; 436/180

[56] References Cited

U.S. PATENT DOCUMENTS

| | | | |
|---|---|---|---|
| 3,646,817 | 3/1972 | Hinchman et al. | 73/864.17 |
| 3,933,048 | 1/1976 | Scordato | 73/864.17 |
| 3,935,734 | 2/1976 | Keegan | 73/864.17 |
| 4,036,064 | 7/1977 | Hydo | 73/864.17 |
| 4,061,037 | 12/1977 | Keegan | 73/864.17 |
| 4,076,503 | 2/1978 | Atwood et al. | 73/864.14 X |
| 4,111,051 | 9/1878 | Tamm et al. | 73/864.12 |
| 4,133,211 | 1/1979 | Sarstedt | 73/864.17 |
| 4,304,138 | 12/1981 | Tervamäki | 73/864.17 |
| 4,905,526 | 3/1990 | Magnussen Jr. et al. | 73/864.18 |
| 4,941,808 | 7/1990 | Qureshi et al. | 417/415 |

FOREIGN PATENT DOCUMENTS 2323997 4/1977 France .

*Primary Examiner*—Thomas P. Noland

*Attorney, Agent, or Firm*—Wolf, Greenfield & Sacks

[57] ABSTRACT

A pipette has a first and second piston to provide for a precise dose measurement and delivery, and a second dose which can be an air blowout to fully expel the precise measured first dose. Preferably, two pistons used are of different diameter with a difference in diameters permitting precise measurement of small doses of, for example, 10 microliters or less.

7 Claims, 3 Drawing Sheets

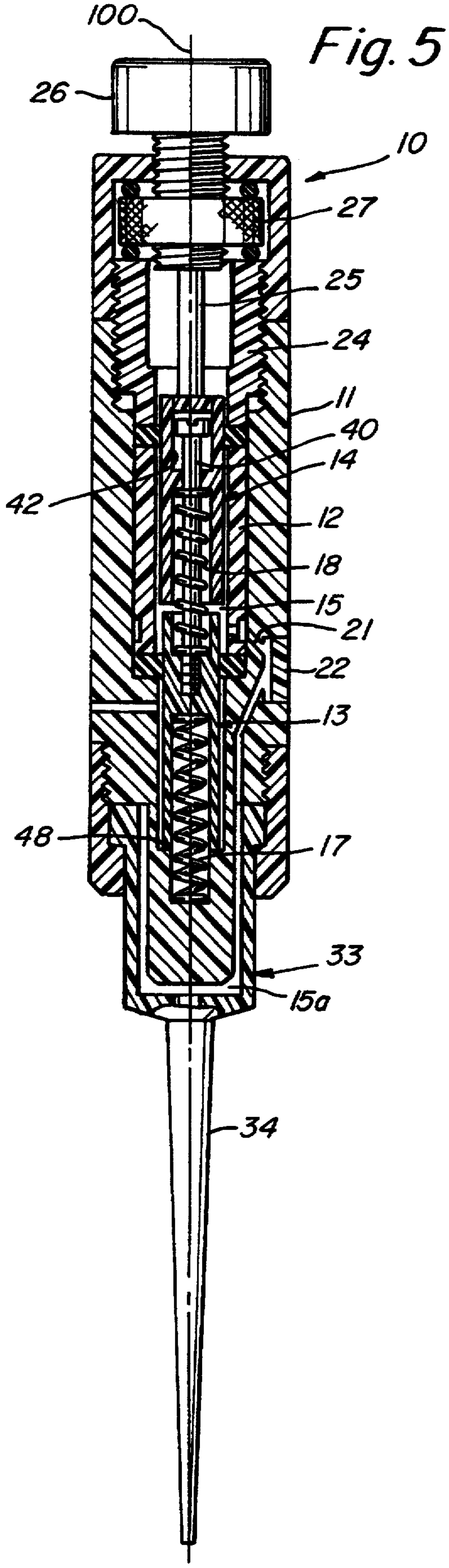
Fig. 5
Fig. 6
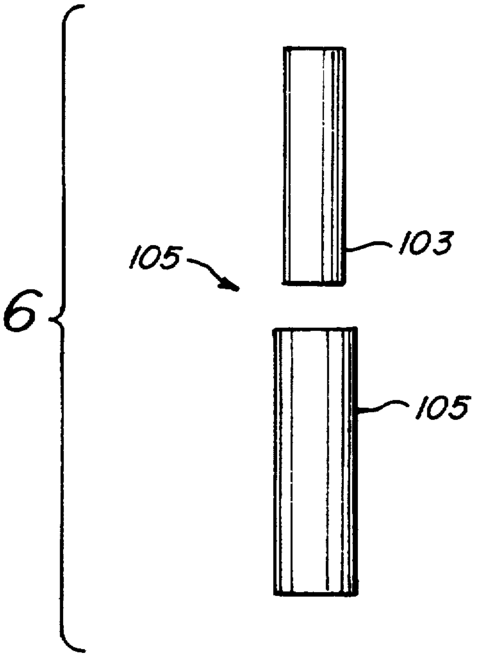

PIPETTE

This application is a continuation, division, of application Ser. No. 07/956906, filed Oct. 2, 1992, which is a continuation of 07/571081, filed Aug. 22, 1990 and both now abandoned.

BACKGROUND OF THE INVENTION

The present invention relates to pipettes which contain at least two pistons, preferably of different diameter, which move within a chamber. Plural diameter pistons in pipette chambers have been known in the past. In such pipettes, helical springs have been known to keep the pistons at an upper position, with a thumb press button, by means of which the pistons can be moved against the force of the helical springs to a predetermined lower position. When first and second springs are used, different rigidities of the springs can be used so that when the thumb button is pressed, a definite change is felt by the user after compressing the first spring, and at the point before compressing the second spring. This spring compression difference in force has been used to provide for different doses, or in some cases, to provide for an air blowout in prior art pipettes. However, the prior art has not provided a plurality of pistons movable together and separately in a pipette chamber to provide for precise small dose measurement and dispensing, along with desired air blowout to completely remove the sample, in a structure which allows movement of both pistons together in a single chamber, movement of a single piston with respect to the other in the chamber, and return of the pistons to their original starting positions.

SUMMARY OF THE INVENTION

It is an object of this invention to provide pipettes which can provide precise doses which can be picked up and dispensed accurately and with ease, and which can have an air blowout to substantially completely remove all doses measured and dispensed by the pipette.

It is another object of this invention to provide a pipette in accordance with the preceding object, which can provide a plurality of different doses.

It is another object of this invention to provide an embodiment of this invention wherein the dose can be loaded in a pipette by an initial movement of plural pistons of the pipette.

It is still another object of this invention to provide a pipette in accordance with any of the preceding objects which uses a plurality of pistons of different diameters to enable small doses to be accurately measured, and further provides for pipette priming, since the pistons are capable of being moved together or one without the other, in order to load and dispense rapidly and efficiently.

Still another object of this invention is to provide methods of pipetting fluids, using a plurality of pistons in accordance with the structure of the preceding objects.

According to the invention, a hand held pipette for obtaining a precise measured dose of a liquid and dispensing that dose, has a first and second piston mounted for reciprocal movement in a chamber. First resilient means permit first movement in a first direction of the first and second pistons together, to displace a defined volume of the material contained in the chamber. When the pistons are of different-diameter, the difference in diameters defines the dose which can be small or large, as desired. A second resilient means permits further movement in a first direction of the second piston in the chamber, while the first piston has stopped movement. Therefore, the first movement can define a precise measured dose and the further movement can provide a blowout to dispense the measured dose when desired. In some cases, the further movement can be used to provide a second does when an air blow out is not needed.

Preferably, the pistons are axially aligned and the first and second means are helical springs which are capable of being resiliently compressed at different forces. A thumb button extends out of the pipette chamber for applying a force to compress one or both of the springs. Thus, a first thumb movement on the pistons, which are preferably axially aligned causes the first and second piston to move against the resilient reciprocal force of one spring. When the second spring pressure is met, after compression of the first spring compression, there is a noticable feel to the thumb of the user. This difference in feel can enable measurement of the first dose and measuring or dispensing of the second dose against the second spring force only when desired.

When the first piston has a smaller diameter than the second piston diameter, the pipette is loaded for a single dose by moving both pistons to depress a first spring, then positioning the pipette with its orifice under a liquid surface, repositioning the first piston and second piston by release of thumb pressure, allowing resilient spring return of the first and second piston to its original position to aspirate a dose, and finally discharging the dose by full depression of both pistons and both springs. According to one method in accordance with this invention, when the second piston is of larger diameter than the first piston, the pistons can be resiliently depressed against the first spring force with a pipette orifice then placed below a liquid sample to be dosed to aspirate a sample dose, the resilient force of the first spring is used to return the pistons to the original position and withdraw the dose from the liquid. The pipette is transferred to an area where the dose is to be dispensed, and first and second spring means compressed to move both the first and second pistons to provide for dispensing of the liquid sample and an air dose. The smaller piston leaves a piston chamber as the larger piston enters, so that the air displaced is equal to the difference in diameters of the pistons, which can be small yet very precise. When an air blast is not needed, both springs used can be depressed initially to measure a second dose of different size, which can then be dispensed without an air blast.

In another method of this invention, the second piston has a smaller diameter than the first piston. In this case, during a first downward movement in an axial direction, caused by thumb pressure, because a larger diameter piston is moving out of a pipette chamber while the smaller diameter piston is moving in, a suction force is created which can be used to draw the sample dose in the chamber during the first directional movement of the pistons. After the dose is brought into the chamber, the pipette can be moved out of the sample fluid and the dose dispensed by releasing thumb pressure and allowing resilient spring pressure to return the pistons to their original position. A second full depression of the piston to compress both springs provides an air blast to clear the pipette.

It is a feature of this invention that when different diameter pistons are used, precise measurement of extremely small doses, i.e., less than 10 microliters, can be made if desired.

Still another feature is that priming of pipettes can be carried out easily because at least one piston is capable of being moved independently of the other within a chamber. Precise measurement can be carried out with simplified apparatus and can be easily used by laboratory technicians and others. No specialized highly technical parts or procedures are necessary for providing mechanically uncomplicated, relatively inexpensive, highly precise and durable pipette for use in a variety of measuring, dosing and dispensing applications. In some cases, the thumb actuator can be replaced by conventional electrical or other motor drive actuators as known in the art.

BRIEF DESCRIPTION OF THE DRAWINGS

The above and other features, objects and advantages of the present invention will be better understood from the following description read in conjunction with the accompanying drawings in which.

FIG. 5 is a semi-diagrammatic view similar to FIG. 4, showing still another position of the pistons;

FIG. 6 is a semi-diagrammatic cross-sectional view of a plural piston alternate embodiment of this invention;

DESCRIPTION OF PREFERRED EMBODIMENT

Figure 1:
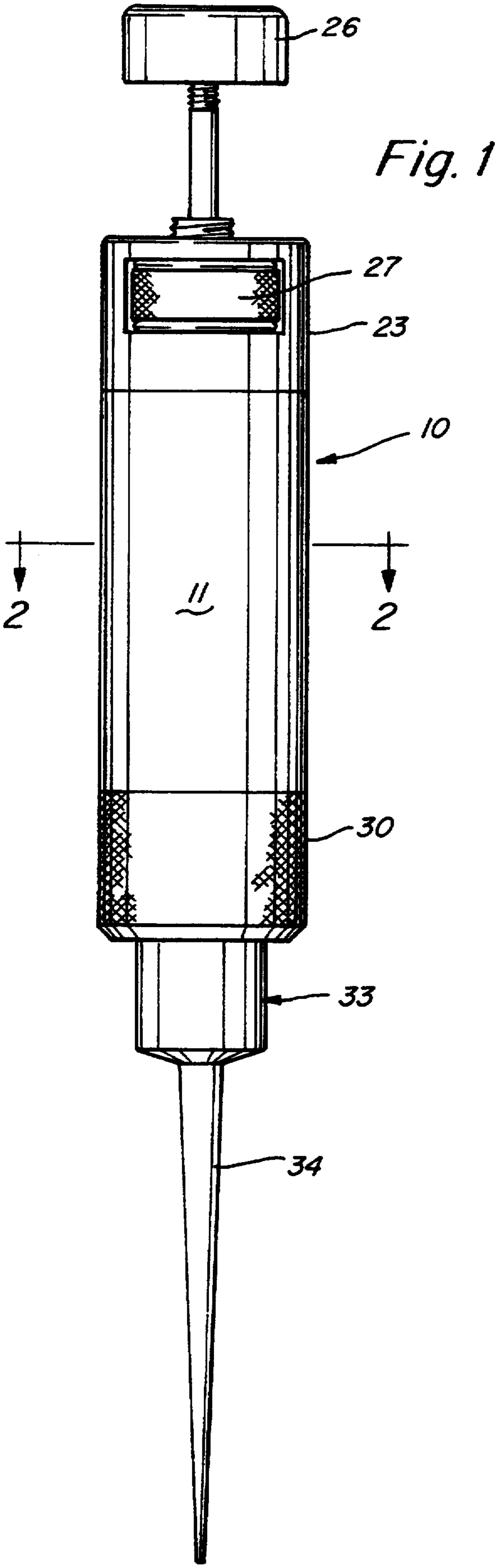
FIG. 1 is the front view of a pipette in accordance with the present invention.

A pipette 10 is generally illustrated in FIG. 1. The pipette is a hand-held pipette having an outer cylindrical casing or main body 11, an inner chamber 15 defining tubular spacer housing 12, and first and second axially arranged pistons 13 and 14, reciprocally mounted for movement along central axis 100 within the chamber 15 defined by the housing 12. The top and bottom pistons 13 and 14 are maintained in position and resiliently moved against a resilient force provided by first and second helical springs 17 and 18.

Figure 3:
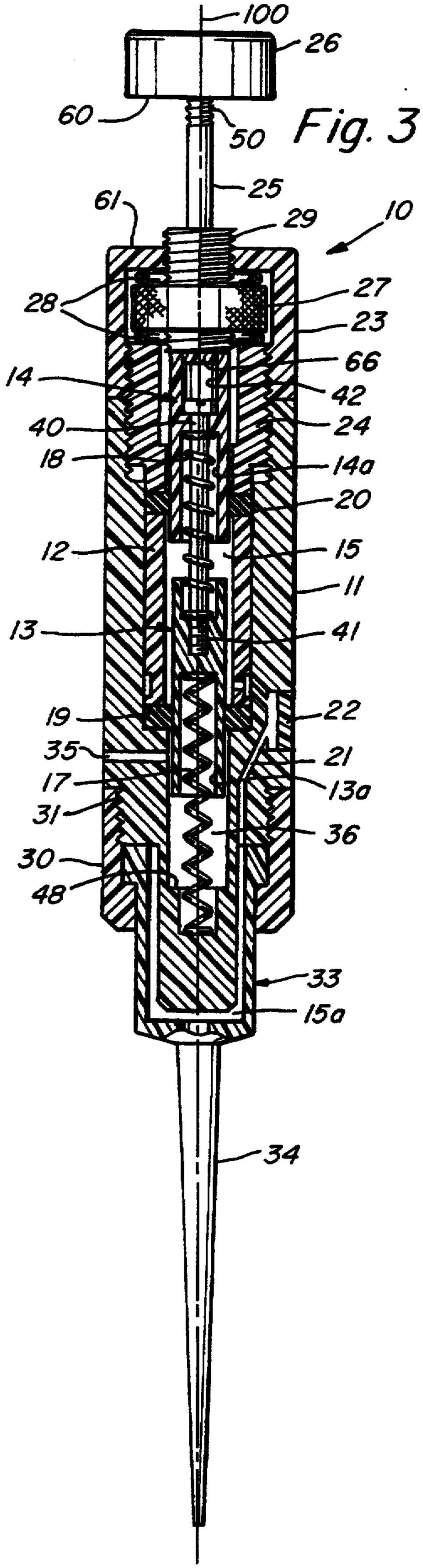
FIG. 3 is a cross-sectional view through line 3—3 of FIG. 2 showing an at rest position of the preferred embodiment of a pipette in accordance with this invention.

Pistons 13 and 14 preferably have hollow bores 13*a*, 14*a* which mount the top and bottom helical compression springs to constantly urge the pistons by resilient pressure to the positions shown in FIG. 3.

Preferably, the casing, housing and piston part are formed of plastic, although metals and the like can be used. Suitable plastics include plexiglass, polycarbonates, polystyrenes, impact polystyrenes, polypropylenes, teflons and the like.

The plastic casing 11 can be a see-through casing, although it is preferably opaque. Since measurement of doses is carried out by feel of springs in the preferred embodiment, it is not necessary to see the interior of the pipette.

The main body 11 has a bottom "O" ring seal at 19, and a top "O" ring seal 20. These seals are sliding seals which enable the circular piston to slide in airtight relationship to define the chamber 15 having a lower portion 15*a* as best shown in FIG. 3. A bore 21 interconnects the lower portion 15*a* with the upper portion of the chamber 15 and is closed to the atmosphere by a plug 22. Two angularly arranged portions of bore 21 provide chamber 15 with a passage through portion 15*a* to a bottom orifice of the nozzle 34. Thus, the chamber 15 communicates directly through a bore 21 with both its upper portion and lower portion which are changed in volume as the pistons are reciprocally moved within the chamber against the bias of the springs.

An end or top cap 23 is screwed to a circular guide sleeve 24. The guide sleeve 24 is in turn connection to the main body portion 11 and acts to slidingly engage the top piston 18. The top piston 18 is fixedly attached to an extension rod 25. A top solid portion 66 closes the end of the hollow piston. The extension rod 25 acts as a push rod in conjunction with the thumb knob 26 which can actuate the pistons to move against the resilient force of the springs when desired, as will be described.

Adjustment nut 27 is fixed against axial movement by "O" retaining rings 28 which permit turning of nut 27 about axis 100. A threaded sleeve 29 abuts and fixes the uppermost position of the upper end of the top piston 14. Screw turning of the adjusting nut 27 provides for positioning of the top piston in a lower position than shown in FIG. 3 or in a higher position, in order to adjust the volume of the chamber 15. This adjustment in volume of the chamber can be used to adjust the dose, since movement of the thumb screw will depress the bottom spring or allow it to extend, since the bottom spring 17 has a lower resistance to compression force than the top spring 18.

Because of the difference in compression force necessary to compress the helical springs 17 and 18, thumb pressure on the knob 26 in an axially downward direction as shown in FIG. 3, will first cause both pistons 17 and 18 to move through the chamber 15. As the lower piston leaves the chamber, the top piston has a portion thereof moving into the chamber. The difference in diameters between the two pistons determines the volume displaced by movement of the pistons. Since one volume is leaving, i.e., the bottom piston, and another volume is entering the chamber, i.e., the top piston, the difference in piston sizes, is equal to the volume of air displaced from the chamber 15 when piston 14 is of larger diameter than piston 13. When piston 14 is of smaller diameter than piston 13, the difference in air displacement is negative in chamber 15 and a liquid can be aspirated into the chamber 15 through nozzle 34 during movement of the pistons.

A cylindrical bottom cap 30 is screwed on to the main body portion 11 at circular threads 31 and has a lip portion, as known in the art, to mount an outwardly flanged nozzle 33 of conventional design. Nozzle 33 has a sample collecting end 34with a lower orifice as known in the art. A vent hole 35 is provided to allow access to a chamber 36 which receives the lower piston 13 as the knob 26 is depressed.

A solid connecting rod 40 is fixed at a lower end 41 by screw threads to the lower or bottom piston 13. At its upper end, the rod 40 is in sliding engagement with a circular recess 42 in the upper piston. Thus, the connecting rod assures that the pistons 13 and 14 are a fixed distance between the pistons until spring 18 is compressed. The rod 42 permits sliding movement of the upper piston 14 towards the lower piston 13, after the lower spring 17 has been compressed and the lower piston 13 meets a stop 48 provided at a circular ledge within the housing or main body 11.

Figure 2:
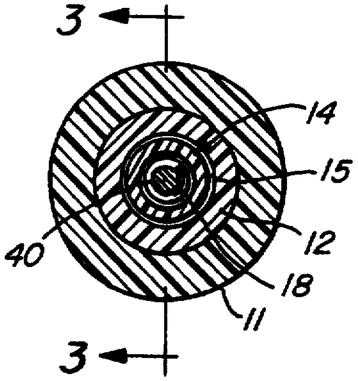
FIG. 2 is a cross-sectional view through line 2—2 of FIG. 1.

The embodiment of FIGS. 1-3 preferably has an upper piston 14 of greater diameter than the bottom piston 13. In the preferred embodiment, the top piston has an outer diameter of 0.256 inch, the bottom piston has an outer diameter of 0.250 inch and the chamber volume is 280 microliters, with a total bottom piston axial movement of 0.5 inch and top piston axial movement, from start to finish, of 0.75 inch.

Figure 4:
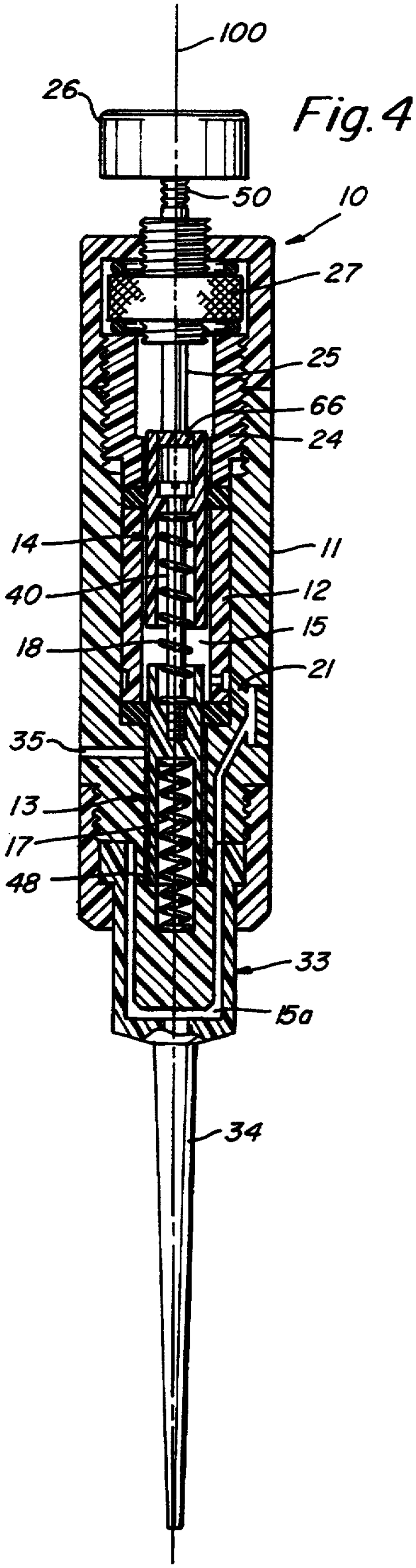
FIG. 4 is a view similar to the view of FIG. 3, showing the pistons in a second position.

In FIGS. 4 and 5, all parts shown are identical to the parts shown in FIG. 3, but the parts are moved to different operative positions of the pipette.

In the preferred embodiment, FIG. 3 shows the pipette at rest position with the pistons raised. To use the pipette to measure a dose, the thumb knob 26 is depressed to the position shown in FIG. 4 where the lower piston meets stop 48 and thumb pressure senses that the lower spring 17 has been compressed and the stiffer spring 18 is acting to resist further movement. The higher spring resistance value of the top spring 18 is now felt and the thumb stops its pressure at that point. The pipette of FIG. 4 is then removed to an area where the nozzle tip is immersed in a sample liquid and thumb pressure is released to allow the pipette to assume the position shown in FIG. 3. In this position, sample fluid is aspirated in a premeasured dose determined by the volume displaced from the chamber by the difference between the diameters of the pistons. In a further movement, the pipette is then placed over an area where the dose is to be deposited and thumb pressure applied to fully depress both pistons against both spring pressures. In a first portion of travel where both pistons are moving, the sample dose is discharged. In a second portion of travel where only the top piston 14 is moving, an air blast from the chamber wipes clean the nozzle, fully dispensing the dose. Thumb pressure can then be removed and the pipette returns by resilient spring pressure to the position shown in FIG. 3.

In a second method of operation of the pipette 10 of FIG. 3, the pipette is depressed fully to the position of FIG. 5 to fully compress both the top and bottom springs while in air. The nozzle tip is then immersed under sample fluid and the thumb pressure released to return the pipette to the position of FIG. 3, aspirating a dose of sample equal to the total volume displacement of both pistons. To deliver the sample, the thumb pressure is applied as in FIG. 5 and the entire dose is delivered. This enables the same pipette to disburse either of two predetermined doses. The second method of operation is not preferred since no air blowout is provided. Alternately, two different liquids can be aspirated by depression of the springs to the FIG. 5 position, aspirating a first liquid by return to the FIG. 4 position and a second liquid by returning to the FIG. 3 position. Return to the FIG. 5 position delivers both liquids from the nozzle.

It should be noted that if the diameters of pistons 13 and 14 are the same, there will be no aspiration in the pipette, since as one piston leaves, another of equal dimension enters.

If the diameter of the lower piston is greater than the diameter of the upper or top piston 14, another method of operation of the pipette is obtained. As diagrammatically shown in FIG. 6, pistons 103 and 104 correspond to pistons 14 and 13, respectively, of the embodiments of FIGS. 3–5, except that the diameter of piston 14 or 103 is smaller than the diameter of piston 13 or 104. This embodiment is designated at 105. The embodiment 105 is illustrated at FIGS. 3, 4 and 5, except that pistons 103 and 104 of smaller and larger diameters respectively, replace pistons 14 and 13 as shown in FIGS. 3–5.

In the embodiment of FIG. 6, when moving from the position shown in FIG. 3 to the position shown in FIG. 4 where the bottom piston 104 is depressed against the spring pressure, the nozzle 34 is maintained immersed in a liquid sample. Since a smaller diameter piston is moving into the chamber while the larger diameter piston is moving out, a vacuum is created in the chamber which aspirates the liquid as the thumb pressure is applied to move the piston downwardly. After full depression of the piston 104, the pipette is removed from the sample liquid and returned to its original position as shown in FIG. 3. The sample can then be displaced with an air blast by depressing the thumb button to the position shown in FIG. 5, after which thumb pressure is released and position of FIG. 3 again assumed. Alternatively, after filling the pipette by going from the position of FIG. 3 to the position of FIG. 4, the dose can be discharged with a subsequent air blast by going from the position of FIG. 4 directly to the position of FIG. 5 to obtain discharge of the sample liquid followed by an air blast. So long as the overall volume displacement of piston 103 during compression of spring 18 is greater than the volume of the sample or dose aspirated, an air blast is obtained.

A second adjustment can be provided in the pipette by use of the screw ending 50 with screw threaded knob 26 threaded thereon. By adjusting the distance of the knob 26 axially along the extension rod, the full compression of that rod can be varied. The knob has a lower surface 60 which, when it meets the upper surface 61 of the pipette, determines the lowermost position of the top piston 14 or 103. Thus, the volume of the chamber 15 can be varied by adjustment of the adjusting nut 27, while the volume of the chamber 15 with respect to the second piston movement can be adjusted by adjustment of the nut 27 positioned axially of the extension rod.

While specific embodiments of the present invention have been shown and described, it will be understood that many variations are possible. For example, the specific method of mounting the pistons within the chamber 15 can vary greatly. While helical springs have been shown which provide a constant force urging both pistons to the position shown in FIG. 3, other spring means can be used. In some cases, leaf springs or reverse spring mountings can be used. The pistons shown and described are hollow to mount the springs, although washers acting as spring stoppers and other piston and spring constructions are possible. In all cases, the piston volumes, whether solid or partially hollow, determine volumes of the chamber that are useful to aspirate liquids. Any liquid can be aspirated, including biological samples and the like.

The pistons are, or act as, solid bodies that create a mass or defined volume that enter and leave the chamber. The pistons can be in any cross-sectional shape and can be formed of any materials.

While the pistons within the chamber are defined in terms of cylindrical members having different diameters, other shapes such as rectangles, squares and the like can be used for the cross-sections of the pistons. In all cases, the cross-section and total volume being displaced by each piston is different and the use of the term "different diameter" is equated in this application with different volumes of pistons as they displace volumes within the chamber. Thus, when referring to a large diameter piston and a small diameter piston, obviously those skilled in the art will understand that a piston having a greater cross-sectional area and a second piston having a lesser cross-sectional area will be the full equivalent of small and large diameter pistons.

While the pipettes are preferably hand-held and actuated by thumb pressure, other embodiments are possible. Any linear actuator can be used to actuate the piston through cams and/or electrical means if desired. The pipettes can be machine mounted for various applications if desired.

What is claimed is:

1. A pipette for obtaining a precise measured dose of a liquid, said pipette comprising a first and second piston mounted for reciprocal movement in a chamber, first resilient means for permitting first movement in a first direction of said first and second pistons to displace a defined volume of a material contained in said chamber, second resilient means for permitting further movement in said first direction of said second piston in said chamber while said first piston has stopped movement, whereby said first movement can define said precise measured dose, said first and second pistons being axially aligned and of different diameter to define a desired said precise dose, said first resilient means comprises a spring capable of being resiliently compressed by a first force, said second resilient means comprises a second spring capable of being compressed by a second force greater than said first force, and said further movement can provide an air blowout.

2. A pipette for obtaining a precise measured dose of a liquid, said pipette comprising a first and second piston mounted for reciprocal movement in a chamber, first resilient means for permitting first movement in a first direction of said first and second pistons to displace a defined volume of a material contained in said chamber, second resilient means for permitting further movement in said first direction of said second piston in said chamber while said first piston has stopped movement, whereby said first movement can define said precise measured dose, said first and second pistons being axially aligned and of different diameter to define a desired said precise dose, said first piston is of smaller diameter than the diameter of said second piston, said pistons being mounted so that as said first and second pistons move in said first direction, a portion of said first piston leaves said chamber and another portion of said second piston enters said chamber.

3. A pipette for obtaining a precise measured dose of a liquid, said pipette comprising a first and second piston mounted for reciprocal movement in a chamber, first resilient means for permitting first movement in a first direction of said first and second pistons to displace a defined volume of a material contained in said chamber, second resilient means for permitting further movement in said first direction of said second piston in said chamber while said first piston has stopped movement, whereby said first movement can define said precise measured dose, said first and second pistons being axially aligned and of different diameter to define a desired said precise dose, said first piston is of larger diameter than the diameter of said second piston, said pistons being mounted so that as said first and second pistons move in said first direction, a portion of said first piston leaves said chamber and another portion of said second piston enters said chamber.

4. A pipette for obtaining a precise measured dose of a liquid, which dose is no greater than 10 microliters, said pipette comprising first and second axially aligned cylindrical different diameter pistons mounted for reciprocal movement in a chamber along a central axis, a first spring mounting the first piston at least partially within said chamber, for movement into and out of said chamber, a second spring mounting said second piston at least partially within said chamber, for movement into and out of said chamber, and an actuating means for applying pressure to one of said springs, whereby both of said pistons move axially in a first direction and whereby only said second piston moves upon further actuation of said means to cause a gas expelling effect in said chamber upon movement of said second piston, said first and second pistons being axially aligned and of different diameter to define a desired said precise dose.

5. A pipette in accordance with claim 4, wherein said second piston has a greater diameter than said first piston.

6. A pipette in accordance with claim 4, wherein said springs are helical springs axially aligned with said pistons and mounted within a cylindrical chamber of a housing, whereby a first axial force can move both of said pistons axially to cause a portion of said second piston to move into said chamber and a portion of said first piston to move out of said chamber and further axial movement can cause said second piston to move towards said first piston and all movements being reciprocal, due to spring action of said helical springs.

7. A method of pipetting fluids, said method comprising, providing a chamber with first and second axially aligned pistons of different diameters mounted in said chamber in an at rest position with said first piston diameter being larger than said second piston diameter, moving said first piston out of said chamber while moving said second piston into said chamber to define a first volume of negative space within said chamber, said movement being carried out with said chamber having a orifice exposed to a liquid, so that air pressure acting on said liquid can aspirate said liquid into said negative space and fill a portion of said chamber with a measured dose of said liquid, removing said pipette from said liquid, moving said second piston in said chamber to disburse said liquid dose and provide an air blast to clear said orifice.

* * * * *